(12) United States Patent
Moe

(10) Patent No.: US 6,293,496 B1
(45) Date of Patent: Sep. 25, 2001

(54) STRAIN COMPATIBLE ATTACHMENT FOR METALLIC THERMAL PROTECTION SYSTEM FOR A SPACE VEHICLE

(75) Inventor: Jeffrey W. Moe, Chula Vista, CA (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/433,534

(22) Filed: Nov. 3, 1999

Related U.S. Application Data

(60) Provisional application No. 60/147,683, filed on Aug. 6, 1999.

(51) Int. Cl.$^7$ ........................................................ B64C 1/00
(52) U.S. Cl. ............................................ 244/120; 244/119
(58) Field of Search ................................ 244/119, 158 A, 244/160, 121, 132; 109/78, 80; 411/180, 181, 175, 174, 428; 85/32; 432/5

(56) References Cited

U.S. PATENT DOCUMENTS

| 3,877,341 | * | 4/1975 | Grimm et al. | 85/32 |
| 4,344,591 | | 8/1982 | Jackson | 244/158 |
| 4,545,761 | * | 10/1985 | Cartwright et al. | 432/5 |
| 4,919,366 | * | 4/1990 | Cormier | 244/160 |
| 5,489,074 | * | 2/1996 | Arnold et al. | 244/158 A |
| 5,564,875 | * | 10/1996 | Matthews | 411/428 |
| 5,575,439 | | 11/1996 | Heinze et al. | 244/131 |
| 5,675,950 | | 10/1997 | Schilham | 52/263 |
| 5,713,168 | | 2/1998 | Schilham | 52/220.5 |
| 5,862,643 | | 1/1999 | Schilham | 52/745.19 |
| 5,928,752 | | 7/1999 | Newquist | 428/74 |

* cited by examiner

Primary Examiner—Charles T. Jordan
Assistant Examiner—George L. Steele
(74) Attorney, Agent, or Firm—Patrick J. Schlesinger; Baker Botts L.L.P.

(57) ABSTRACT

A strain compatible attachment arrangement for releasably securing a plurality of metallic thermal protection system (TPS) panels to a space vehicle substructure to provide an outer mold line of the aeroshell of the vehicle. The TPS panels are spaced from the substructure to support aerodynamic loading on the TPS outer panel surface while isolating the outer panel surface from strains in the substructure and to isolate the vehicle substructure from direct thermal energy conductance though the outer TPS panel surface of the space vehicle. The attachment arrangement provides for a stand-off leg member to be secured at an inner end to the substructure and at its outer end to be releasably secured to a corner of a TPS panel, such panels being arranged in an edge abutting relationship. The outer end of each leg member includes a nutplate that is attached to such leg member by a clip and which has a locking portion that interlocks with a complementarily shaped locking insert positioned in a corner of a TPS panel to preclude rotation between the nutplate and the TPS panel when a bolt is inserted through the insert into locking engagement with the nutplate. Since each TPS panel is secured to each stand-off leg member from a position external to each panel, an individual TPS panel may be removed easily, as desired, for repair or replacement.

22 Claims, 2 Drawing Sheets

STRAIN COMPATIBLE ATTACHMENT FOR METALLIC THERMAL PROTECTION SYSTEM FOR A SPACE VEHICLE

CROSS-REFERENCE TO RELATED APPLICATION

This application claims the benefit of U.S. Provisional Application No. 60/147,683 entitled "Strain Compatible Attachment for Metallic Thermal Protection System" filed Aug. 6, 1999.

BACKGROUND OF THE INVENTION

1. Field of the Invention

The present invention generally to improvements in space vehicles and more particularly, but not by way of limitation, to a method and arrangement for providing a strain compatible attachment for a metal thermal protection system for a space vehicle and similar transatmospheric and high speed aerospace vehicles.

2. Description of the Prior Art

Future space vehicles in the heavy launch arena, such as reusable launch vehicles (RLV's), will be required to realize increased performance through the incorporation of durable, robust, low density, high stiffness thermal protection systems (TPS). Such TPS for an aerospace vehicle will require aircraft like operations and maintenance support to allow the next generation of RLV's to be economically feasible. In addition, such TPS must provide an effective means of transmitting aerodynamic loads (shear and pressure differences). Thus, the load transfer system must have low weight, result in low thermal stresses in the underlying aerostructure, and not transfer excessive heat to such underlying aerostructure.

Insulation structures, which consist of a plurality of highly heat-resistant panels to be connected to the airframe of a space vehicle have been known from the U. S. Space Shuttle Program, for example. During reentry into the atmosphere, individual panels or even panel fields often are damaged by thermal and flow mechanical effects so significantly that they must be replaced before the next launch. This replacement process is very time consuming and expensive due to the types of fastening for the TPS panels that have been used to date, e.g., adhesive bonding. A side from such criteria of replaceablility and repairability, it should be borne in mind that the fastening of the TPS panels to an airframe must be extremely robust and reliable in order to withstand the high flow mechanical loads occurring during certain phases of flight. On the other hand, however, the arrangement for attachment of the TPS panels should allow for thermal expansion and contraction of the panels, without generating undesired forces and stresses in the structure. In addition, fuel tank pressurization and flight induced mechanical deflections can not be allowed to interfere with TPS integrity and sealing capabilities. Also, the best possible protection of the fastening elements against high thermal loads is desirable.

One approach to satisfy these load bearing and thermal isolation functions at low thermal stresses employs a load bearing insulation attached to the primary aerostructure. Since most load bearing insulations have low strength and no ductility, they are usually segmented with small gaps for low thermal stress. One load bearing insulation previously developed includes the use of sintered quartz-fiber tiles to provide a reusable surface insulation for a RLV. While nonmetallic insulations are simple to attach to the aerostructure, they have a common potential disadvantage. That is they are weak, brittle materials, consequently, surface frayings, erosion, cracking or breakage rates may be high and may increase refurbishment requirements.

One fastening scheme for connecting each TPS panel to the next panel and to the airframe of a RLV is seen in U.S. Pat. No. 4,344,591. In this arrangement, each panel has, on its front side, two projecting tongues, which engage straps on the airframe as well as in recesses of the next panel. Thus, it is possible to install rows of panels in the circumferential direction of the fuselage of the space plane, wherein the first and last panels require a separate fastening on one side. However, it is obvious that no individual panels, but only rows of panels or contiguous partial areas of rows of panels can be replaced here. Also, a clearance free fastening of the panels without hindering their longitudinal changes caused by thermal effects is practically impossible in this manner.

In U.S. Pat. No. 5,575,439 an arrangement for removably securing a TPS panel to a space plane is seen. This arrangement employs three fastening points for the underside of each TPS panel with the aerostructure of a space plane. One point, which is provided at two opposing corners of a TPS panel, employs a fixed finger secured to the panel which slips under a fixed finger secured to the aerostructure. The second point, which is provided at one corner of each panel, employs a slotted member secured to the panel that slidingly engages an assembling bolt. The third or fixed point, that is provided on the corner of a panel opposed to the second point, includes a spring member that is secured to the aerostructure and which may be deformed by insertion of a tool from the exterior of the panel to deform the spring member sufficiently to permit it to capture a bolt carried by the panel upon release from engagement with the tool. No provision is made to isolate the TPS panels from substructure strains or to isolate the substructure from direct thermal conductance through the panel.

A removable thermal insulation blanket for mounting on the exterior of a reusable launch vehicle is disclosed in U.S. Pat. No. 5,928,752. This patent shows a blanket having first and second low density ceramic batting layers with a metal screen disposed between such layers. A plurality of fasteners are secured to the screen and are then further secured to mating fasteners positioned on the exterior surface of the launch vehicle by a means of a tool inserted directly through the outer batting layer. There is no provision to accommodate thermal expansion differences that will occur between a TPS panel and the aerosubstructure during such operations as fueling, ascent and reentry of the space vehicle.

In U.S. Pat. No. 5,489,074 an arrangement is disclosed for removably attaching TPS panels to the body of a space vehicle. This arrangement teaches a complex mechanism comprising a number of springs, latches and machined housings to isolate the movement of each panel. A wire that is permanently installed in the gap between two fairing elements of adjacent thermal insulation modules and which may be activated from outside the TPS panels to release a ball-locking bolt which secures the panel to the substructure and permit an insulative panel to be separated from the underlying insulative layer positioned directly upon the substructure of the space vehicle. While one TPS panel could apparently be removed by pulling the release wires on the four sides of the illustrated panel, it is not apparent how the panel could subsequently be replaced since the locking mechanism is buried beneath each side of each panel and is secured to the substructure of the space vehicle.

U.S. Pat. Nos. 5,675,950; 5,713,168; and 5,862,643 assigned to a common assignee all relate to a stand-off pedestal system for constructing a raised floor above an existing floor of a room for the purpose of providing a computer room or data processing center with sufficient space to accommodate cables, pipes, hoses, conduits and other routings for computer interconnections. The intent is to provide a constant standardized distance from the existing floor to the same size floor panels for easily affording access to the free space there below. This construction is intended to be a static design in an environmentally controlled computer room and is not intended to relieve thermal and structural deflections between thermal protection panels for a space vehicle.

As illustrated by the prior patents noted above, efforts have been made to provide an attachment means for securing thermal protection system panels to the aerostructure of a reusable launch vehicle or other space vehicle but such efforts have provided attachments that are heavy and complex and very time consuming in the installation of such panels. In addition, because of the interconnection of such panels and connecting arrangements it is very difficult or impossible to remove and replace one or a few separated TPS panels that may have been damaged in flight.

It is a general object of this invention to provide a strain compatible arrangement for providing support for a thermal protection panel system for a space vehicle.

It is another object of the present invention to provide a stand-off arrangement for a thermal protection panel system that can accommodate thermal expansion differences that occur during fueling of the space vehicle and during ascent and re-entry into the earth's atmosphere.

It is yet another object of the invention to support thermal protection panels at the outside mold line surface of a space vehicle.

It is a further object of the invention to provide a strain compatible stand-off arrangement for a thermal protection panel system that will permit ease of installation and ready removal and replacement of individual panels.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention withing the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates a strain compatible attachment arrangement for securing a plurality of metallic thermal protection (TPS) panels to the substructure of a space vehicle, such as a reusable launch vehicle. The metallic TPS panels are attached in an edge abutting relationship to provide a coterminous outer TPS panel surface that is spaced from the substructure portion of the vehicle and which provides the outside mold line surface of the space vehicle. The attachment arrangement provides a separate stand-off means that is attached at one end to the vehicle substructure and at the other end to one corner of a TPS panel. Each TPS panel when viewed in a plan view will have three or four corners and may assume a number of shapes such as triangular, square, trapezoidal, etc. and may be curved. Each corner of each TPS panel is provided with an apertured insert provided with a plurality of circumferentially arranged locking projections.

Each stand-off member is provided as sheet metal leg member, preferably provided with a longitudinally extended reinforcing rib portion, that is secured directly to the substructure or indirectly such as being secured to a clip member that is secured to a beam of the aerospace vehicle substructure. The stand-off member is provided at its upper end with a nutplate member which is secured to the leg member by a suitable spring clip member and that has at its upper portion an upwardly extending portion having outwardly extending locking projections that are received with the apertured insert in a corner of a TPS panel. In assembly, the positioning of an apertured corner of a panel over the locking portion of the leg member causes the nutplate locking portion to be guided into locking insertion with the apertured insert in the panel. Thus, when a bolt is lockingly driven into the nutplate member, such member is precluded from rotation by the locking engagement with the apertured insert in the corner of the panel. Each corner of each panel is attached by a separate leg member with two, three or four leg members being attached by means of a common base to the vehicle substructure.

Thus, the novel stand-off arrangement of the invention can accommodate thermal expansion differences and structural deformations between the vehicle substructure and the TPS panel surface that may occur during fueling or tanking, ascent to a desired altitude and during re-entry into the earth's atmosphere. Also, the stand-off arrangement provides thermal management to the tank frame substructure of the vehicle and supports the TPS panels as the vehicle's outer mold line surface.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar numerals refer to similar parts in the various views of the invention.

DETAILED DESCRIPTION OF THE INVENTION

Figure 1:
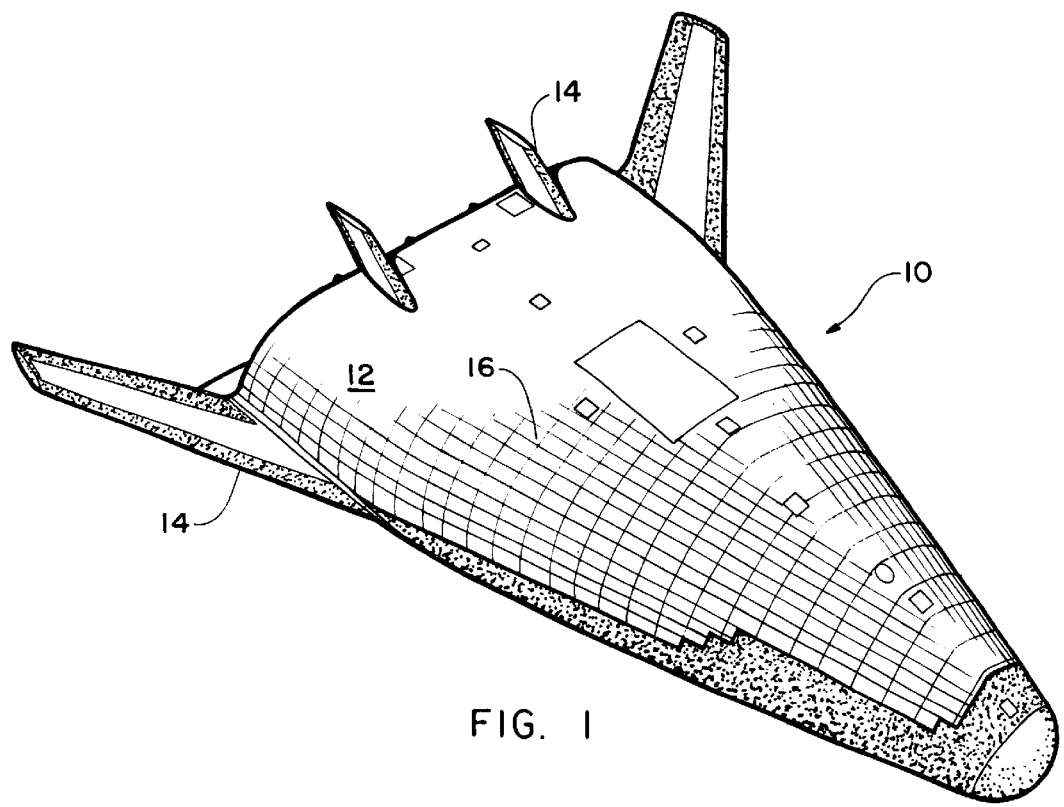
FIG. 1 is a perspective of a space vehicle, such as a reusable launch vehicle, with which the present invention may be favorably employed.

Referring now to the drawings in detail, and in particular to FIG. 1, the reference character 10 designates a space vehicle that is exemplary of reusable launch vehicles (RLV's) contemplated for missions such as single stage-to-orbit and the like. For such space vehicles to be successful they will need to realize increased performance through the incorporation of durable, robust, low density, high-stiffness thermal protection systems (TPS). For the next generation of RLV's to be economically possible, they will require aircraft like operations and maintenance support. One type of TPS that may be used in a service environment up to 2000° F. is a metallic TPS that may be used as the aeroshell 12 of the RLV 10 by being spaced from the substructure of the RLV by novel attachment arrangement of the instant invention. Other areas of the RLV 10 such as the leading edges 14 of the wings and certain control surfaces that may experience even more elevated temperatures during conditions, such as re-entry into the earth's atmosphere and may require carbon-carbon materials to be able to successfully withstand such temperatures.

The plurality of TPS panels 16 which comprise the aeroshell TPS surface 12 of the RLV 10 are attached to the substructure of the RLV 10 in an edge abutting arrangement by the novel strain compatible attachment of the present invention. The stand-off members of the strain compatible attachment arrangement of the invention not only support such panels at the outside mold line but also provide the thermal management to the tank frame (not shown) of the substructure of the RLV 10. Thus, the novel strain attachment arrangement of the present invention provides for attaching the TPS panels to the vehicle tank frame through stand-off members, shown in detail hereinafter, that accommodate thermal expansion differences that occur during RLV fueling or tanking, ascent of the RLV to a desired orbital position and re-entry into the earth's atmosphere.

Figure 2:
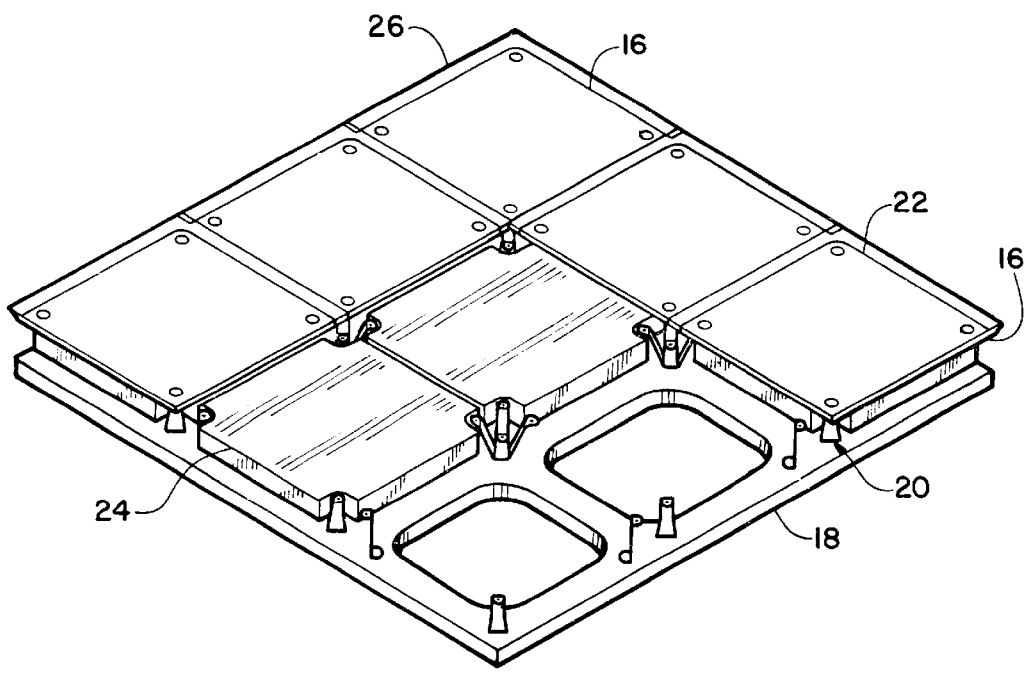
FIG. 2 is a simplified partial perspective illustrating the attachment of TPS panels to a space vehicle substructure.

Referring now to FIG. 2, it will be seen that a plurality of exemplary TPS panels 16, which in the illustration are shown as generally square in a plan view and having a predetermined thickness, are arranged in a generally edge abutting relationship. These TPS panels 16 are spaced from and attached to a suitable substructure 18 of the RLV 10 by the strain compatible attachment arrangement, generally designated 20, of the instant invention. While the substructure 18 is shown as an apertured substructure, such representation should not be considered limiting in any respect. Such substructure 18 may also be planar, curved in a plurality of directions, and could be a beamed structure for supporting fuel tanks (not shown) used by the space vehicle 10.

The strain compatible attachment arrangement 20, which will be described hereinafter in greater detail, provides for an independent attachment of each corner 22 of each TPS panel 16 to the substructure 18. The TPS panel 16, when considered from a planar view, would be considered to have three corners in the instance of a triangularly shaped TPS panel and to have four corners in the instance of a TPS panel having four sides such as a square, rectangle, trapezoid or other four sided shaped. Each TPS panel 16 may also be planar in shape or curved in several directions.

The metallic TPS panel 16, that is illustrated, is shown to be a metallic honeycomb type panel that is comprised of an appropriate metal alloy for the temperatures to be encountered by the RLV 10 in its mission. As seen in FIG. 2, each TPS panel 16 is also provided on its inner surface with a metallic insulation bag 24 that is suitably welded to each TPS panel 16. Each metallic insulation bag 24 may contain a suitable insulation material that is appropriate for temperatures to be imposed upon the RLV 10 during the course of its mission. Each TPS panel 16 is also considered to include an edge seal 26 that is brazed or welded to an edge of the TPS panel 16 to assure that the plurality of attached TPS panels 16 provide a substantially coterminous outer mold line (OML) of the space vehicle 10 to provide the aeroshell 12 for such craft. In implementation of the substructure 18, it would also be anticipated for some configurations that the substructure 18 would also receive layers of material (not shown) that would provide additional heat reflection. While aligning each attachment 20 to a corner of each TPS panel 16 and radially about the center of each TPS panel 16, a secure global attachment is provided for each TPS panel 16 while still permitting each corner 22 of such panel 16 to flex. By attaching each TPS panel 16 above the substructure 18 and to such substructure 18 through the novel attachment means 20 of the present invention, the panels 16 are isolated from strains of the substructure 18 of the vehicle 10 while also isolating the substructure 18 from direct thermal energy conductance through the panels 16.

The attachment arrangement 20 is thus designed to support aerodynamic loading while simultaneously isolating the TPS panel 16 structure from thermal and substructure strain. As will be seen hereinafter in greater detail, the shape of the attachments 20 allows it to remain flexible enough to accommodate panel thermal induced bowing, but rigid enough to resist dynamic vibrations that may occur during the mission of the RLV.

Figure 3:
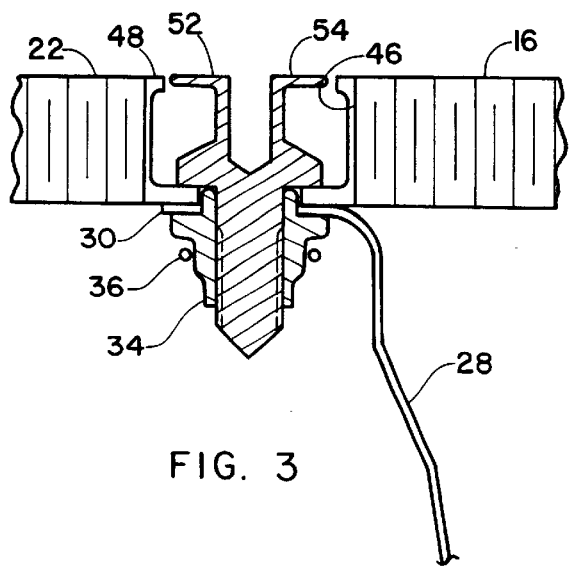
FIG. 3 is a partial cross section of a preferred embodiment of the present invention for providing an attachment arrangement for the TPS panel system.
Figure 5:
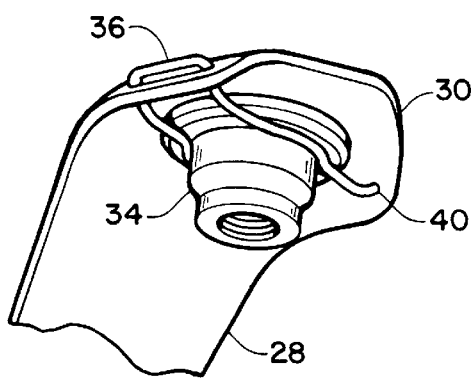
FIG. 5 is a partial perspective of the attachment arrangement of FIG. 3.
Figure 4:
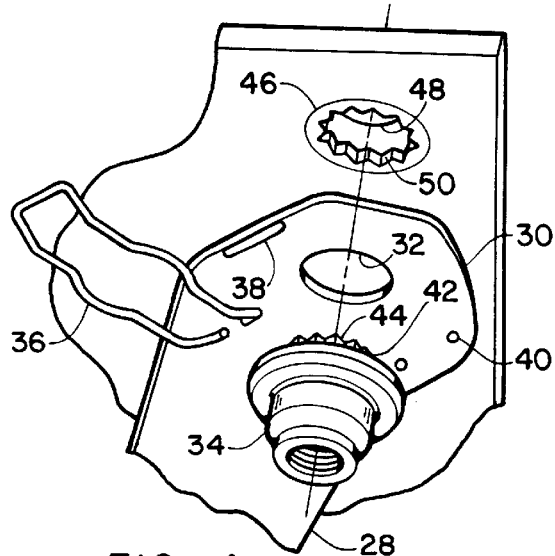
FIG. 4 is a perspective, partially exploded, of the attachment arrangement of FIG. 3.

Referring now to FIGS. 3, 4 and 5, it will be seen that the attachment arrangement 20 includes a leg member 28 for each corner 22 of each TPS panel 16. The particular configuration of a leg member 28 will be described in more detail hereinafter and the present discussion will address the novel attachment of a leg member 28 to a corner 22 of the panel 16. Each leg member 28 includes an upper generally planar portion 30 that is provided with a preferably annularly shaped aperture 32. A suitable nutplate 34 is secured to the upper portion 30 of the leg member 28 by a suitable clip member 36 that is shown as being inserted into a suitable aperture 38 on one side of the aperture 32 and into a pair of spaced apertures 40 provided on the opposing side of such aperture 32. The purpose of the clip member 36 is to snugly hold the nutplate 34 against the upper portion 30 of the leg member 28 while yet providing a limited rotational movement therebetween as may be required for the purpose to be hereinafter defined.

The upper portion of each nutplate 34 is provided with a locking means in the form of an annular upwardly extending projection 42 having a plurality of circumferentially arranged faces 44. Each corner 22 of each TPS panel 16 is provided with a suitable aperture 46 in which is bonded an annular insert 48 having a plurality of circumferentially arranged locking faces 50 that are complementarily shaped to lockingly receive the locking faces 44 of the projection 42 of the nutplate 34. The aperture 32 is sized to permit the locking projection 42 to extend therethrough and into locking engagement with the insert 48.

It will be understood that after the clip 36 has been inserted into the upper portion of the stand-off leg member 28 for securing the nutplate 34 and the member 28 has been attached to the substructure 18, as will be described hereinafter in detail, a corner 22 of a TPS panel 16 will be positioned over a leg member 28 and locked thereunto. The locking portion 42 will be guided into locking engagement with the locking portion 50 of the insert 46 since, while the insert 46 is fixed in the corner 22 of the panel 16, the nutplate 34 and its locking portion 42 are snugly but not fixedly held by the clip 36 so that the locking portion 42 may be guided into locking engagement with the locking portion 50 of the insert 48 by a slight rotation, as needed, by the engagement of the two locking portions 42 and 46. Thus, with the nutplate 34 locked against rotation with respect to such insert 46, a suitable bolt 52 may be inserted into the insert 46 and driven into locking engagement with the nutplate 34 by any suitable means such as an Allen wrench (not shown). The upper portion 54 of the bolt 52 preferably has an upper surface that is coterminous with the upper surface of the panel 16 when driven to a fully locked position. Thus, the panel 16 may be easily installed from the exterior of the aeroshell surface 12 and individual panels 16 may be easily removed, as required, for replacement or repair.

Figure 6:
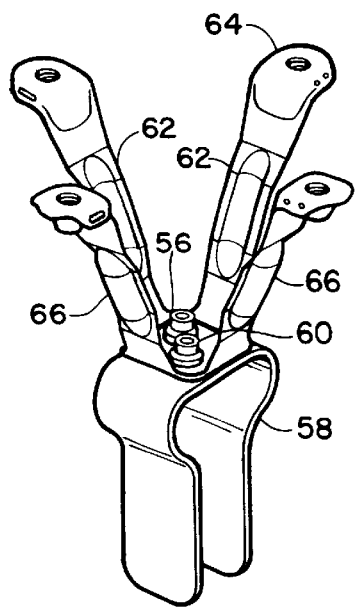
FIG. 6 is a four leg member of the attachment arrangement of the invention.

Referring now to FIG. 6, one aspect of the preferred embodiment of the invention will be illustrated. As will be shown in subsequent FIGURES, the stand-off member 28 may be shown to have one, two, three or four leg members extending from a common base, the particular stand-off member 28 being chosen for installation of a corner 22 of a TPS panel 16 being determined by the position of the panel 16 in the aeroshell surface 12 of the vehicle 10. In FIG. 6, it will be seen that the stand-off member 28 in this instance has a common base portion 56 that is secured to a clip member 58 by at least two bolts 60 to preclude rotation thereon. The clip member 58 may be suitably secured to a beam or other portion of the substructure 18. Thus, the securement of the clip member 58 to the substructure 18 may be varied vertically as required to assure that the four leg members 62 that extend upwardly from such base portion 56 provide a rosette arrangement of such four leg members 62 for attachment to four separated corners 22 of four separate panels, as is generally seen in FIG. 2. Preferably, the four leg members 62, each of which is provided with an apertured upper portion 64, such as was seen in FIGS. 3, 4 and 5, and the base portion 56 are stamped from a suitable sheet metal material to provide the illustrated configuration. As is seen in FIG. 6, each leg member 62 is provided with a longitudinally extending deformed portion 66 to provide a reinforcing rib for each leg member 62.

Figure 7:
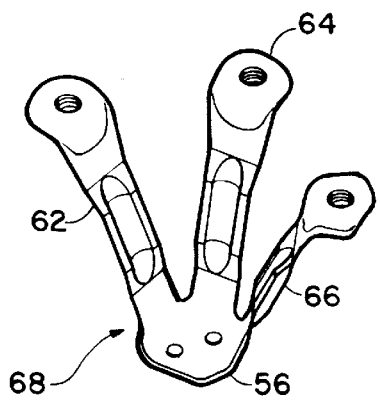
FIG. 7 is a three leg member of the attachment arrangement of the invention.

For ease of illustration, in FIG. 7 a three legged example 68 is shown as exemplary of the stand-off attachment arrangement 20 with the same numerals applying to similar parts as in the previous FIGURES.

Figure 8:
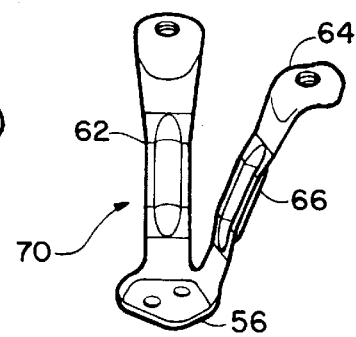
FIG. 8 is a two leg member of the novel attachment arrangement.

Similarly, in FIG. 8 a two legged example 70 is shown as exemplary of the stand-off attachment arrangement 20 with the same numerals applying to similar parts as in the previous FIGURES.

Figure 9:
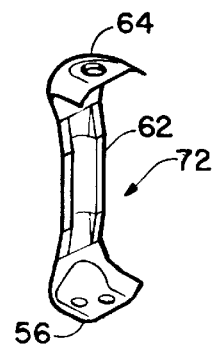
FIG. 9 is a one leg member of the present invention.

Also, in FIG. 9 a one legged example is shown as exemplary of the stand-off attachment arrangement 20 with the same numerals applying to similar parts as in the previous FIGURES.

As is apparent from an inspection of FIGS. 6–9, the leg members 62 may be configured as desired to provide necessary strength while still providing strain relief as desired. The shape of the leg member 62 allows it to remain flexible enough to accommodate panel 16 thermal induced bowing, but rigid enough to resist dynamic vibrations. Also, by adjusting the size of the bead or reinforcing rib, the leg member 62 may be optimized for its intended design load.

Thus, it has been demonstrated above that the present invention provides a novel strain relief attachment arrangement for attaching TPS panels to an aerospace vehicle substructure or to the vehicle tanks support structure to provide thermal management to the tank frame and to the vehicle substructure and to support the TPS panel at the vehicle outside mold line surface. Also, the invention provides for reduced installed weight of a durable, robust, low-density, high-stiffness TPS panel arrangement which can be easily installed and that permits individual TPS panels to be removed or replaced for repair or maintenance.

The present disclosure includes that contained in the appended claims as well as that of the foregoing description. Although, this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A strain compatible attachment arrangement for securing a plurality of metallic thermal protection system panels to a space vehicle substructure, which arrangement comprises:

a plurality of attachment means for attaching a plurality of said panels in a edge abutting relationship to a portion of a substructure of a space vehicle to provide a coterminous outer panel surface spaced from said substructure portion of the vehicle to support aerodynamic loading of said outer panel surface while isolating said outer panel surface from strains in said substructure and to isolate said vehicle substructure from direct thermal energy conductance through said outer panel surface of the space vehicle, wherein each panel is shaped to have at least three corners, each of said plurality of attachment means comprises at least one stand-off leg member that is secured at a first end to said attachment means and is releasably secured at a second end to one corner of one panel, and said plurality of attachment means are secured to the substructure of the space vehicle to space the outer panel surface from the space vehicle substructure to isolate said outer panel surface from thermal expansion differences with said space vehicle substructure during vehicle tanking and during ascent and re-entry flight maneuvers.

2. The arrangement of claim 1 wherein said plurality of attachment means includes said at least one stand-off leg member that is releasably secured at said second end to one corner of a panel whereby each corner of each panel is separately coupled to the space vehicle substructure.

3. The arrangement of claim 1 wherein each stand-off leg member cooperates with a panel to provide securement of each such panel to each stand-off leg member from a position exterior to an outer surface of each such panel.

4. The arrangement of claim 3 wherein each stand-off leg member is provided at said second end with a nutplate means placed in registration with said nutplate aperture which cooperates with a bolt inserted from the exterior of a panel through the panel to secure a corner of said panel to said stand-off leg member.

5. The arrangement of claim 4 wherein the nutplate means of each stand-off leg member is provided at its upper portion with a locking portion which is received by a complementarily shaped locking portion of an access aperture means provided in each corner of a panel to preclude any rotation between said nutplate means and the panel as a bolt is lockingly inserted into the nutplate means secured to upper portion of the stand-off leg member.

6. The arrangement of claim 5 wherein said locking portion of each nutplate means comprises an annular portion that is provided with a plurality of spaced projections that cooperate with a plurality of complementarily shaped spaced projections of an access member positioned in each access aperture means that is provided in each corner of each panel to lock each panel against rotation as a bolt member is lockingly inserted into the nutplate means secured to the upper portion of the bracket member.

7. The arrangement of claim 6 wherein each corner of each panel is provided with an aperture for fixedly receiving said access member, and the bolt when inserted into a nutplate means has an upper outer surface that is substantially coterminous with the surrounding outer panel surface whereby a substantially smooth continuous outer surface is provided for each panel.

8. The arrangement of claim 2 wherein said stand-off leg member comprises a formed sheet metal member.

9. The arrangement of claim 8 wherein each stand-off leg member is formed to include a longitudinally reinforcing stiffening rib.

10. The arrangement of claim 1 wherein at least one of said plurality of attachment means comprises a common base member that is secured to the vehicle substructure and at least two stand-off members which extend upwardly for releasable locking engagement with adjacent corners of two abutting panels.

11. The arrangement of claim 1 wherein at least one of said plurality of attachment means comprises a common base member that is secured to the vehicle substructure and at least three integral stand-off leg members which extend upwardly from said base member for releasable locking engagement with adjacent corners of three abutting panels.

12. The arrangement of claim 1 wherein at least one of said plurality of attachment means comprises a common base member that is secured to the vehicle substructure and at least four integral stand-off leg members which extend upwardly from said base member for releasable locking engagement with adjacent corners of four abutting panels.

13. An arrangement for a low density, high stiffness, integrated, metallic, outer aeroshell assembly for a space vehicle, comprising:
an inner substructure of a space vehicle;
an outer aeroshell formed of a plurality of abutting metallic thermal protection system panels, each panel having at least three corners, that is spaced from said inner substructure and which provides an outside mold line surface for a space vehicle, and
a plurality of stand-off means secured to said inner substructure,
each of said plurality of stand-off means comprising at least one stand-off leg member that is secured at a base end to said attachment means and releasably and lockingly secured at a spaced end to one corner of one panel to support each panel and attach it to the substructure,
whereby thermal expansion differences and structural deflections between the space vehicle substructure and the outer aeroshell are accommodated during vehicle tanking, ascent and re-entry of the space vehicle.

14. The arrangement of claim 13 wherein said plurality of stand-off means comprises said at least one stand-off leg member that is secured at said base end to one of said plurality of attachment means and is releasably locked at said spaced end to each corner of each of said plurality of panels.

15. The arrangement of claim 14 wherein said at least one stand-off leg member is formed of a sheet metal material.

16. The arrangement of claim 15 wherein each of said at least one stand-off leg members is engaged in releasable locking engagement at said spaced end with a corner portion of a similar number of said plurality of panels.

17. The arrangement of claim 16 wherein said at least one stand-off leg member is provided at its upper portion with a secured nutplate means which receives a locking bolt through an aperture provided in each corner of each of said plurality of panels for releasably locking each of said at least one stand-off leg members to a corner of each of said plurality of panels.

18. The arrangement of claim 17 which further includes a non-rotational means which precludes relative rotation between each of said at least one stand-off leg members and each corner of each of said plurality of panels while a locking bolt is being operatively inserted through the aperture into locking engagement with said nutplate means to secure each corner of each of said plurality of panels to each of said at least one stand-off leg members without inducing strain in either the panel of the stand-off leg member.

19. The arrangement of claim 18 wherein at least one of said plurality of stand-off means comprises four metallic stand-off leg members which are formed in a rosette to extend from a central base portion that is secured to the vehicle substructure, each stand-off leg member being formed of a sheet material and provided with a deformed longitudinally extending reinforcing rib portion and being releasably locked to a corner of one of four abutting metallic panels whereby the aeroshell provides the outer mold line surface of the space vehicle.

20. The arrangement of claim 3 wherein each stand-off leg member has a nutplate aperture formed through said second end of each stand-off leg member.

21. The arrangement of claim 4 wherein said nutplate means is secured to said second end of each stand-off leg member by a clip member.

22. A strain compatible attachment arrangement for securing a plurality of metallic thermal protection system panels to a space vehicle substructure, which arrangement comprises:
a plurality of attachment means for attaching a plurality of said panels in a edge abutting relationship to a portion of a substructure of a space vehicle to provide a coterminous outer panel surface spaced from said substructure portion of the vehicle to support aerodynamic loading of said outer panel surface while isolating said outer panel surface from strains in said substructure and to isolate said vehicle substructure from direct thermal energy conductance through said outer panel surface of the space vehicle, wherein each panel is shaped to have at least three corners, each of said plurality of attachment means comprises at least one stand-off leg member that is secured at a first end to said attachment means and is releasably secured at a second end to one corner of one panel, and said plurality of attachment means are secured to the substructure of the space vehicle to space the outer panel surface from the space vehicle substructure to isolate said outer panel surface from thermal expansion differences with said space vehicle substructure during vehicle tanking and during ascent and re-entry flight maneuvers, wherein each stand-off leg member cooperates with a panel to provide securement of each such panel to each stand-off leg member from a position exterior to an outer surface of each such panel, wherein each stand-off leg member has a nutplate aperture formed through said second end of each stand-off leg member, wherein each stand-off leg member is provided at said second end with a nutplate means placed in registration with said nutplate aperture which cooperates with a bolt inserted from the exterior of a panel through the panel to secure a corner of said panel to said stand-off leg member, and wherein said nutplate means is secured to said second end of each stand-off leg member by a clip member.

* * * * *

UNITED STATES PATENT AND TRADEMARK OFFICE
CERTIFICATE OF CORRECTION

PATENT NO. : 6,293,496 B1
DATED : September 25, 2001
INVENTOR(S) : Jeffrey W. Moe It is certified that error appears in the above-identified patent and that said Letters Patent is hereby corrected as shown below:

<u>Column 8,</u>
Line 64, "claim 3" should read -- claim 20 --

Signed and Sealed this

Twenty-third Day of September, 2003

JAMES E. ROGAN
*Director of the United States Patent and Trademark Office*